United States Patent
Mahoney et al.

(10) Patent No.: US 7,246,482 B2
(45) Date of Patent: Jul. 24, 2007

(54) GAS TURBINE ENGINE BLEED AIR POWER ASSIST SYSTEM AND METHOD

(75) Inventors: Timothy D. Mahoney, Chandler, AZ (US); Mitchell J. Laidlaw, Tempe, AZ (US); Anthony C. Libera, Tempe, AZ (US)

(73) Assignee: Honeywell International, Inc., Morristown, NJ (US)

( * ) Notice: Subject to any disclaimer, the term of this patent is extended or adjusted under 35 U.S.C. 154(b) by 384 days.

(21) Appl. No.: 10/893,035

(22) Filed: Jul. 16, 2004

(65) Prior Publication Data

US 2006/0010875 A1     Jan. 19, 2006

(51) Int. Cl.
    *F02C 7/32*     (2006.01)
    *F02C 6/00*     (2006.01)

(52) U.S. Cl. .................. 60/204; 60/39.183; 60/802; 60/791; 60/226.1

(58) Field of Classification Search ............. 60/226.1, 60/39.183, 802, 791, 204
See application file for complete search history.

(56) References Cited

U.S. PATENT DOCUMENTS

| | | | |
|---|---|---|---|
| 3,375,996 A * | 4/1968 | Wilde | 60/226.1 |
| 3,631,735 A | 1/1972 | McCarty et al. | |
| 3,722,214 A | 3/1973 | Guillot | |
| 3,890,855 A | 6/1975 | Reenskoug | |
| 3,902,822 A | 9/1975 | Andrews et al. | |
| 3,994,617 A * | 11/1976 | McCombs | 60/795 |
| 4,077,202 A * | 3/1978 | Schutze | 60/788 |
| 4,109,743 A | 8/1978 | Brusaglino et al. | |
| 4,195,472 A * | 4/1980 | Robinson | 60/39.163 |
| 4,456,425 A | 6/1984 | McCarty et al. | |
| 5,039,281 A | 8/1991 | Johnston | |
| 5,174,109 A | 12/1992 | Lampe | |
| 5,363,641 A | 11/1994 | Dixon et al. | |
| 5,694,765 A * | 12/1997 | Hield et al. | 60/39.163 |
| 5,967,461 A | 10/1999 | Farrington | |
| 6,183,388 B1 | 2/2001 | Hawkins | |
| 6,319,841 B1 * | 11/2001 | Bergman et al. | 438/706 |
| 6,615,586 B1 | 9/2003 | Boric | |
| 6,647,708 B2 * | 11/2003 | Bornhoft et al. | 60/39.17 |

* cited by examiner

*Primary Examiner*—Ted Kim
(74) *Attorney, Agent, or Firm*—Ingrassia Fisher & Lorenz

(57) ABSTRACT

A bleed air power assist system is coupled to a gas turbine engine that includes a high pressure turbine, a low pressure turbine, and an electrical generator driven by the high pressure turbine. The bleed air power assist system selectively bleeds air discharged from the high pressure turbine and supplies it to an air turbine that is also coupled to the generator. Thus, the system selectively reduces the power extracted from the high pressure turbine. This, coupled with the bleed air that is diverted from the low pressure turbine, allows the low pressure spool to run at lower speeds when high engine thrust is not needed or desired, but when the generator is still needed to supply high electrical loads.

20 Claims, 1 Drawing Sheet

GAS TURBINE ENGINE BLEED AIR POWER ASSIST SYSTEM AND METHOD

TECHNICAL FIELD

The present invention relates to gas turbine engines and, more particularly, to a gas turbine engine bleed air power assist system and method for selectively driving a power drive unit using engine bleed air.

BACKGROUND

A gas turbine engine may be used to supply power to various types of vehicles and systems. For example, gas turbine engines may be used to supply propulsion power to an aircraft. Many gas turbine engines include at least three major sections, a compressor section, a combustor section, and a turbine section. The compressor section receives a flow of intake air and raises the pressure of this air to a relatively high level. In a multi-spool (e.g., multi-shaft) engine, the compressor section may include two or more compressors. The compressed air from the compressor section then enters the combustor section, where a ring of fuel nozzles injects a steady stream of fuel. The injected fuel is ignited by a burner, which significantly increases the energy of the compressed air.

The high-energy compressed air from the combustor section then flows into and through the turbine section, causing rotationally mounted turbine blades to rotate and generate energy. The air exiting the turbine section is then exhausted from the engine. Similar to the compressor section, in a multi-spool engine the turbine section may include a plurality of turbines. The energy generated in each of the turbines may be used to power other portions of the engine.

In addition to providing propulsion power, a gas turbine engine may also be used to supply either, or both, electrical and pneumatic power to the aircraft. For example, in the past some gas turbine engines include a bleed air port between the compressor section and the turbine section. The bleed air port allows some of the compressed air from the compressor section to be diverted away from the turbine section, and used for other functions such as, for example, main engine starting air, environmental control, and/or cabin pressure control. More recently, however, gas turbine engines are being designed to not include bleed air ports. This is in response to a desire to more fully utilize electrical power for main engine starting air, environmental control, and cabin pressure control. Thus, instead of using bleed air to support these various functions, the high pressure turbine may be used to drive one or more electrical generators to supply electrical power to support these functions.

The above-described configuration, in which the gas turbine engines drive one or more electrical generators, is believed to provide safe and reliable operations. However, it does present certain drawbacks. For example, during low power engine operations, such as during aircraft idle descent conditions, the high pressure turbine may need to supply a significant amount of energy to maintain the aircraft electrical load. This in turn can cause the low pressure turbine to run at an undesirably high speed, resulting in an undesirably high idle thrust. Although it has been postulated that this undesirable thrust can be alleviated by dumping a portion of the air discharged from the high pressure turbine overboard, such a solution results in wasted energy. In turn, this can significantly reduce engine efficiency, increase fuel consumption, and/or increase overall operational costs.

Hence, there is a need for a system that reduces the thrust generated by a "no-bleed-air" gas turbine engine during low power operations, that does not significantly reduce engine efficiency, and/or significantly increase fuel consumption, and/or increase overall operational costs. The present invention addresses one or more of these needs.

BRIEF SUMMARY

The present invention provides a gas turbine engine bleed air power assist system and method.

In one embodiment, and by way of example only, a gas turbine engine system includes an engine case, a high pressure turbine and a low pressure turbine, a generator, a bleed air conduit, a flow control valve, and an air turbine. The high pressure turbine and a low pressure turbine are disposed in flow series within the engine case. The high pressure turbine and low pressure turbine are mounted on a high pressure spool and a low pressure spool, respectively, and each spool is rotationally mounted within the engine case. The generator is coupled to the high pressure spool and receives a drive force therefrom. The bleed air conduit has an inlet port, an outlet port, and a flow passage therebetween. The bleed air conduit inlet port is fluidly coupled between the high pressure and low pressure turbines to receive a flow of bleed air from the high pressure turbine. The flow control valve is mounted on the bleed air conduit and is selectively movable between at least a closed position, in which the bleed air conduit inlet port is fluidly isolated from the bleed air conduit outlet port, and an open position, in which the bleed air conduit inlet port is in fluid communication with the bleed air conduit outlet port. The air turbine has a fluid inlet and a rotationally mounted output shaft. The air turbine fluid inlet is in fluid communication with the bleed air conduit outlet port to receive bleed air therefrom when the flow control valve is in the open position, and the air turbine output shaft is coupled to the generator.

In another exemplary embodiment, in a gas turbine engine system including a high pressure turbine, a low pressure turbine, and a generator coupled to the high pressure turbine to receive a drive force therefrom, a method of providing power-assist to the high pressure turbine includes determining an operational state of the gas turbine engine system. Based at least in part on the determined operational state, air discharged from the high pressure turbine is selectively supplied to an air turbine that is coupled to the generator, whereby the air turbine rotates and supplies a drive force to the generator in addition to that provided by the high pressure turbine.

Other independent features and advantages of the preferred bleed air power assist system and method will become apparent from the following detailed description, taken in conjunction with the accompanying drawings which illustrate, by way of example, the principles of the invention.

DETAILED DESCRIPTION OF A PREFERRED EMBODIMENT

Figure 1:
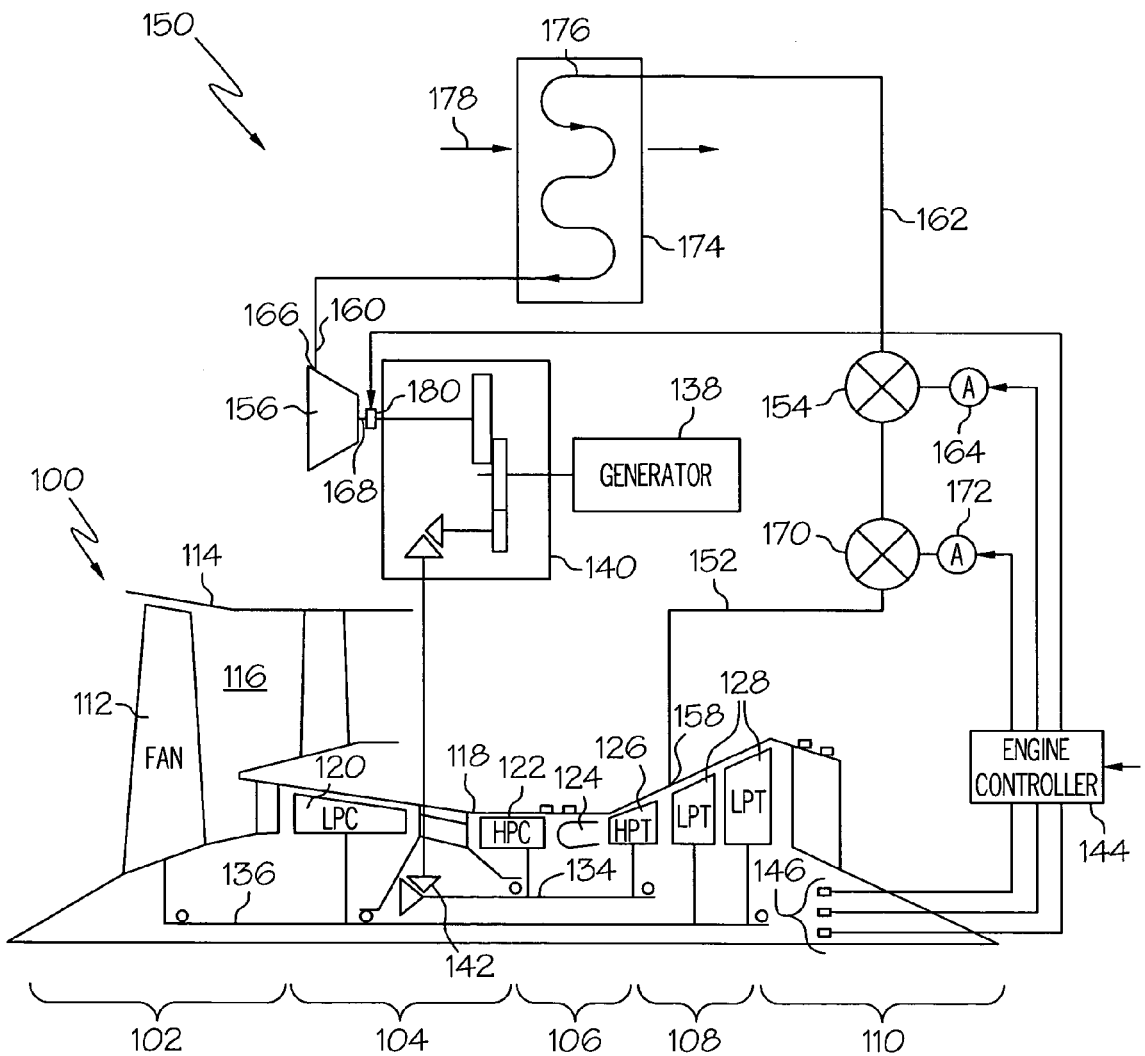
FIG. 1 is a simplified schematic representation of an exemplary turbofan gas turbine engine that includes a bleed air power assist system according to an embodiment of the present invention.

Before proceeding with the detailed description, it is to be appreciated that the following detailed description is merely exemplary in nature and is not intended to limit the invention or the application and uses of the invention. In this regard, it is to be additionally appreciated that the described embodiment is not limited to use in conjunction with a particular type of turbine engine. Hence, although the present embodiment is, for convenience of explanation, depicted and described as being implemented in a multi-spool gas turbine jet engine, it will be appreciated that it can be implemented in various other types of turbines, and in various other systems and environments. Furthermore, there is no intention to be bound by any theory presented in the preceding background or the following detailed description.

A simplified representation of an exemplary multi-spool turbofan gas turbine jet engine 100 is depicted in FIG. 1, and includes an intake section 102, a compressor section 104, a combustion section 106, a turbine section 108, and an exhaust section 110. The intake section 102 includes a fan 112, which is mounted in a fan case 114. The fan 112 draws air into the intake section 102 and accelerates it. A fraction of the accelerated air exhausted from the fan 112 is directed through a bypass section 116 (shown only partially in FIG. 1) disposed between the fan case 114 and an engine case 118, and provides a forward thrust. The remaining fraction of air exhausted from the fan 112 is directed into the compressor section 104.

The compressor section 104 includes two compressors, a low pressure compressor 120, and a high pressure compressor 122. The low pressure compressor 120 raises the pressure of the air directed into it from the fan 112, and directs the compressed air into the high pressure compressor 122. The high pressure compressor 122 compresses the air still further, and directs the high pressure air into the combustion section 106. In the combustion section 106, which includes a combustor 124, a plurality of non-illustrated fuel injectors, and one or more non-illustrated igniters, the high pressure air is mixed with fuel and combusted. The combusted air is then directed into the turbine section 108.

The turbine section 108 includes two turbines, a high pressure turbine 126 and a low pressure turbine 128, disposed in axial flow series in the engine case 118. The combusted air from the combustion section 106 expands through each turbine 126, 128, causing each to rotate. The air is then exhausted through a propulsion nozzle disposed in the exhaust section 110, providing addition forward thrust. As the turbines rotate, each drives equipment in the engine 100 via concentrically disposed shafts or spools. For example, the low pressure turbine 128 drives the fan 112 and the low pressure compressor 120 via a low pressure spool 136, and the high pressure turbine 126 drives the high pressure compressor 122 via a high pressure spool 134.

In addition to driving the high pressure compressor 122, the high pressure turbine 126 also drives a generator 138. More specifically, in addition to the above-described components, the engine 100 also includes a gearbox 140. In the depicted embodiment, the high pressure spool 134 is coupled to the engine gearbox 140 via a gear set 142. The engine gearbox 140 is in turn coupled to the generator 138. Thus, whenever the high pressure turbine 126 rotates, it supplies a drive force, via the engine gearbox 140, to the generator 138, which in turn generates electrical power. The electrical power is supplied, for example, to the aircraft electrical distribution system for use by various other systems and components. It will be appreciated that the generator 138 may be any one of numerous types of AC or DC generators, but in a preferred embodiment it is a brushless AC generator.

The overall operation of the engine 100 is controlled via an engine controller 144. The engine controller 144, as is generally known, is used to control the output power of the engine 100 by, for example, controlling fuel flow rate to the engine 100, as well as controlling airflow through the engine 100. In the depicted embodiment, the engine controller 144 receives signals from a plurality of sensors 146 that are disposed at various locations on and within the engine 100. The sensors 146 are used to sense various physical parameters associated with the engine 100 such as, for example, various temperatures, engine speed, and air flow, and supply signals representative of the sensed parameters to the engine controller 144. The engine controller 144 processes the signals received from the sensors 146 and, among other things, supplies various commands to the engine 100 to control its operation. It will be appreciated that the engine controller 140 may be any one of numerous types of engine controllers such as, for example, a FADEC (Full Authority Digital Engine Controller). As will be described more fully further below, the engine controller 140 also controls the flow of turbine bleed air from the engine 100. Before doing so, however, a detailed description of the remaining components depicted in FIG. 1 will be provided.

As was previously mentioned, during relatively low engine thrust operations the high pressure turbine 126 still needs to supply sufficient drive force to the generator 138 to maintain the needed electrical load. Thus, air flow through the high pressure turbine 126 may be higher than what is needed to supply the desired engine thrust. As shown in FIG. 1, a turbine bleed air power assist system 150 is coupled to the engine 100, and is used to selectively bleed some of the air discharged from the high pressure turbine 126. As may be readily seen, the bleed air supplied to the bleed air power assist system 150 bypasses the low pressure turbine 128, thereby reducing the thrust generated by the engine 100.

The bleed air power assist system 150 includes a bleed air conduit 152, a flow control valve 154, and an air turbine 156. The bleed air conduit 152 includes an inlet port 158, an outlet port 160, and a flow passage 162 fluidly coupling the inlet 158 and outlet 160 ports together. The inlet port 158 is fluidly coupled between the high pressure turbine 126 and the low pressure turbine 128, and the outlet port 160 is fluidly coupled to the air turbine 156. Thus, when bleed air flows through the bleed air conduit 152, the bleed air is supplied to the air turbine 156, causing it to rotate.

The flow control valve 154 is mounted on the bleed air conduit 152 and is movable between a closed position and an open position. In the closed position, the bleed air conduit inlet port 158 is fluidly isolated from the bleed air conduit outlet port 160, and bleed air flow through the bleed air conduit flow passage 162 is prevented. Conversely, when the flow control valve 154 is in the open position, the bleed air conduit inlet 158 and outlet 160 ports are in fluid communication with one another, and bleed air flows through the bleed air conduit flow passage 162 to the air turbine 156. The position of the flow control valve 154 is controlled via valve position commands supplied by the engine controller 144. As such, the flow control valve 154 includes a valve actuator 164 that is configured to receive the valve position commands and, in response to the commands, move the flow control valve 154 to the commanded position. It will be appreciated that the commanded position may be the closed position, the fully open position, or some throttle position between the closed and fully open position.

The air turbine 156 includes a fluid inlet 166 and a rotationally mounted output shaft 168. The air turbine fluid inlet 166 is, as alluded to above, coupled to the bleed air conduit outlet port 160. The air turbine 156 is additionally coupled, via the output shaft 168, to the engine gearbox 140. Thus, when the flow control valve 154 is moved to an open position, bleed air flows through the bleed air conduit 152, and into and through the air turbine 156, causing it to rotate. As the air turbine 156 rotates, it supplies a drive force to the engine gearbox 140, via the output shaft 168. The drive force supplied by the air turbine 156 supplements the drive force supplied to the engine gearbox 140 from the high pressure turbine 126 for driving the generator 138. It will be appreciated that the air turbine 156 may be any one of numerous types of air turbines including, for example, a vaned radial turbine, a vaneless radial turbine, and a vaned axial turbine.

The air that is discharged from the high pressure turbine 126 is relatively hot, especially when the engine 100 is operating at high power. During high power operations, the bleed air power assist system 150 is not needed. Thus, in order to allow the flow control valve 154 to be designed for lower temperatures, or to use valves designed for lower temperatures, the bleed air power assist system may additionally include a shut-off valve 170. The shut-off valve 170, which is preferably implemented as a poppet valve, includes an actuator 172 that, similar to the flow control valve actuator 164, is responsive to valve position commands supplied from the engine controller 144 to move the shut-off valve between an open and a closed position. The shut-off valve 170 is preferably not used to throttle bleed air flow, but is instead used to either prevent or allow bleed air flow to and through the flow control valve 154. Thus, the shut-off valve 170 and actuator 172 are preferably configured such that the shut-off valve 170 is either fully open or fully closed.

In addition to the shut-off valve 170, the bleed air power assist system 150 may also include a heat exchanger 174 to control or limit bleed air temperature. The heat exchanger 174, if included in the system 150, preferably includes a first fluid flow path 176 and a second fluid flow path 178. The first fluid flow path 176 is coupled in series-fluid communication in the bleed air conduit fluid passage 162. Thus, bleed air that flows through the bleed air conduit 152 also flows through the heat exchanger first flow path 176. The heat exchanger second flow path 178 is preferably coupled to receive a portion of the bypass air directed through the engine bypass section 116. Thus, the bypass air that flows through the heat exchanger second flow path 178 removes heat from the bleed air flowing through the first heat exchanger flow path 176.

Although the heat exchanger 174 is illustrated as being fluidly disposed between the flow control valve 154 and the air turbine 156, it will be appreciated that the heat exchanger 174 could be disposed between the shut-off valve 170 and the flow control valve 154, or upstream of the shut-off valve 170. It will be additionally appreciated that the heat exchanger 174 could be mounted in any one of numerous locations. However, it is preferably mounted within the engine bypass section 116.

The heat exchanger 174, by reducing the temperature of the bleed air, would allow components disposed downstream of the heat exchanger 174 to be designed for lower operating temperatures. However, as may be appreciated, such heat removal concomitantly reduces the energy of the bleed air being supplied to the air turbine 154. Thus, in many instances, including the heat exchanger 174 in the system 150 may not be desired.

When the engine 100 is operating and the shut-off valve is in the closed position, the high pressure turbine 126 could back drive the air turbine 154. This could be potentially detrimental to the air turbine 154 and could additionally result in unwanted energy dissipation. Thus, as FIG. 1 additionally shows, the bleed air power assist system 150 could also include a clutch 180. The clutch 180, if included, is coupled between the air turbine output shaft 168 and the engine gearbox 140, and is configured to selectively couple the air turbine output shaft 168 to, and decouple the air turbine output shaft 168 from, the engine gearbox 140. In the depicted embodiment, the clutch 180 is coupled to receive clutch command signals from the engine controller 144. In response to the clutch command signals, the clutch 180 is configured to move to either an engage or disengage position. In the engage position, the clutch 180 couples the air turbine output shaft 168 to the engine gearbox 140, and in the disengage position the clutch 180 decouples the air turbine output shaft 168 from the engine gearbox 140. Although the clutch command signals are preferably supplied by the engine controller 144, it will be appreciated that the commands could be supplied from a dedicated clutch controller, or from a separate controller in a different system.

Having described the configurations of the engine 100 and the bleed air power assist system 150, and the general functionality of each, a more detailed description of the overall operation and interaction of the engine and bleed air power assist system 150 will now be provided. As noted above, the engine 100 includes various sensors 146 that sense various physical parameters associated with the engine 100, and supply sensor signals representative of the sensed parameters to the engine controller 144. The engine controller 144 additionally receives input signals representative of, for example, the thrust being commanded of the engine 100 from the cockpit. The engine controller 144, based at least in part on the sensor signals, determines the operational state of the engine 100 and supplies, among other things, appropriate command signals to the shut-off valve 170, the flow control valve 154, and the clutch 180, to thereby move these components to the appropriate positions.

For example, if the engine controller 144 determines that the air flow through the low pressure turbine 128 exceeds that which is needed for the commanded thrust, the engine controller 144 will issue appropriate valve position command signals and clutch command signals to move the shut-off valve 170 to the open position, the flow control valve 154 to a desired position, and the clutch 180 to the engage position. As a result, a portion of the air discharged from the high pressure turbine 126 will be bled away from the low pressure turbine 128, and into the bleed air conduit 152. It will be appreciated that the flow rate through the bleed air conduit 152 is based, at least in part, on the commanded position of the flow control valve 154. In any case, the flow of bleed air is directed into the air turbine 156, causing it to rotate and supply a drive force to the engine gearbox 140, to thereby assist the high pressure turbine 126 in driving the generator 138.

Conversely, if the engine controller 144 determines that the bleed air power assist system 150 is not needed, the engine controller 144 will issue appropriate command signals that move the shut-off valve 170 and flow control valves 154 to the closed positions, and the clutch to the disengaged position. As a result, no air is bled from the engine 100 and the drive force supplied to the generator 138 comes solely from the high pressure turbine 126.

The bleed air power assist system 150 selectively supplements the power supplied to the generator from, and thus reduces the power extracted from, the high pressure turbine 126. This, coupled with the bleed air that is diverted from the low pressure turbine, allows the low pressure spool 136 to run at lower speeds when high engine thrust is not needed or desired, but when the generator 138 is still needed to supply high electrical loads.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A gas turbine engine system, comprising:
   an engine case;
   a high pressure turbine and a low pressure turbine disposed in flow series within the engine case, the high pressure turbine and low pressure turbine mounted on a high pressure spool and a low pressure spool, respectively, each spool rotationally mounted within the engine case;
   a generator having an input shaft coupled to the high pressure spool to receive a drive force therefrom;
   a bleed air conduit having an inlet port, an outlet port, and a flow passage therebetween, the bleed air conduit inlet port fluidly coupled between the high pressure and low pressure turbines to receive a flow of bleed air from the high pressure turbine;
   a flow control valve mounted on the bleed air conduit and selectively movable between at least a closed position, in which the bleed air conduit inlet port is fluidly isolated from the bleed air conduit outlet port, and an open position, in which the bleed air conduit inlet port is in fluid communication with the bleed air conduit outlet port;
   a heat exchanger having at least a first fluid flow path coupled in series-fluid communication in the bleed air flow passage, the heat exchanger operable to transfer heat from the bleed air to a cooling fluid; and
   an air turbine having a fluid inlet and a rotationally mounted output shaft, the air turbine fluid inlet in fluid communication with the bleed air conduit outlet port to receive bleed air therefrom when the flow control valve is in the open position, the air turbine output shaft coupled to the generator.

2. The system of claim 1, further comprising:
   one or more gears coupled between the high pressure spool and the generator.

3. The system of claim 2, further comprising:
   one or more gears coupled between the air turbine output shaft and the generator.

4. The system of claim 1, further comprising:
   a clutch coupled between the air turbine output shaft and the generator and movable between (i) an engage position, in which the air turbine output shaft is coupled to the generator, and (ii) a disengage position, in which the air turbine output shaft is not coupled to the generator.

5. The system of claim 1, further comprising:
   a fan case at least partially surrounding the engine case and spaced apart therefrom to form an air bypass section;
   a fan coupled to the low pressure spool and configured, upon rotation thereof, to supply a flow of fan bypass air through the air bypass flow passage.

6. The system of claim 5, wherein the heat exchanger further includes a second fluid flow path coupled to receive at least a portion of the fan bypass air flow, the heat exchanger adapted to transfer heat between the bleed air and fan bypass air.

7. The system of claim 1, further comprising:
   a shut-off valve mounted on the bleed air conduit between the bleed air conduit inlet port and the flow control valve, the shut-off valve movable between at least closed position, in which the bleed air conduit inlet port is fluidly isolated from the flow control valve, and an open position, in which the bleed air conduit inlet port is in fluid communication with the flow control valve.

8. The system of claim 1, wherein the generator is configured, upon receipt of the drive force, to generate electrical power.

9. The system of claim 8, further comprising:
   a control circuit adapted to receive one or more sensor signals representative of one or more engine parameters and operable, in response thereto, to supply one or more valve position command signals; and
   a valve actuator coupled to the flow control valve, the valve actuator coupled to receive the valve position command signals and operable, in response thereto, to selectively move the flow control valve to a commanded position, to thereby control the flow of bleed air to the air turbine.

10. The system of claim 9, wherein the control circuit is further operable, in response to the sensor signals, to supply one or more clutch command signals, and wherein the system further comprises:
    a clutch coupled between the air turbine output shaft and the generator, the clutch further coupled to receive the clutch command signals and operable, in response thereto, to move between (i) an engage position, in which the air turbine output shaft is coupled to the generator, and (ii) a disengage position, in which the air turbine output shaft is not coupled to the generator.

11. A gas turbine engine system, comprising:
    an engine case;
    a high pressure turbine and a low pressure turbine disposed in flow series within the engine case, the high pressure turbine and low pressure turbine mounted on a high pressure spool and a low pressure spool, respectively, each spool rotationally mounted within the engine case;
    a generator having an input shaft coupled to the high pressure spool to receive a drive force therefrom and operable, upon receipt of the drive force, to generate electrical power;
    a bleed air conduit having an inlet port, an outlet port, and a flow passage therebetween, the bleed air conduit inlet port fluidly coupled between the high pressure and low pressure turbines to receive a flow of bleed air from the high pressure turbine;
    a flow control valve mounted on the bleed air conduit and selectively movable between at least a closed position, in which the bleed air conduit inlet port is fluidly isolated from the bleed air conduit outlet port, and an open position, in which the bleed air conduit inlet port is in fluid communication with the bleed air conduit outlet port;
    an air turbine having a fluid inlet and a rotationally mounted output shaft, the air turbine fluid inlet in fluid communication with the bleed air conduit outlet port to receive bleed air therefrom when the flow control valve is in the open position, the air turbine output shaft coupled to the generator;

a control circuit adapted to receive one or more sensor signals representative of one or more engine parameters and operable, in response thereto, to supply (i) one or more valve position command signals and (ii) one or more clutch command signals;

a valve actuator coupled to the flow control valve, the valve actuator coupled to receive the valve position command signals and operable, in response thereto, to selectively move the flow control valve to a commanded position, to thereby control the flow of bleed air to the air turbine; and a clutch coupled between the air turbine output shaft and the generator, the clutch coupled to receive the clutch command signals and operable, in response thereto, to move between (i) an engage position, in which the air turbine output shaft is coupled to the generator, and (ii) a disengage position, in which the air turbine output shaft is not coupled to the generator.

12. The system of claim 11, further comprising:
one or more gears coupled between the high pressure spool and the generator.

13. The system of claim 12, further comprising:
one or more gears coupled between the air turbine output shaft and the generator.

14. The system of claim 11, further comprising:
a heat exchanger having at least a first fluid flow path coupled in series-fluid communication in the bleed air flow passage, the heat exchanger operable to transfer heat from the bleed air to a cooling fluid.

15. The system of claim 14, further comprising:
a fan case at least partially surrounding the engine case and spaced apart therefrom to form an air bypass section;
a fan coupled to the low pressure spool and configured, upon rotation thereof, to supply a flow of fan bypass air through the air bypass flow passage.

16. The system of claim 15, wherein the heat exchanger further includes a second fluid flow path coupled to receive at least a portion of the fan bypass air flow, the heat exchanger adapted to transfer heat between the bleed air and fan bypass air.

17. The system of claim 11, further comprising:
a shut-off valve mounted on the bleed air conduit between the bleed air conduit inlet port and the flow control valve, the shut-off valve movable between at least closed position, in which the bleed air conduit inlet port is fluidly isolated from the flow control valve, and an open position, in which the bleed air conduit inlet port is in fluid communication with the flow control valve.

18. In a gas turbine engine system including a high pressure turbine, a low pressure turbine, and a generator coupled to the high pressure turbine to receive a drive force therefrom, a method of providing power-assist to the high pressure turbine, comprising the steps of:
determining an operational state of the gas turbine engine system;
selectively supplying air discharged from the high pressure turbine to an air turbine that is coupled to the generator based at least in part on the determined operational state, whereby the air turbine rotates and supplies a drive force to the generator in addition to that provided by the high pressure turbine; and
selectively removing heat from the air discharged from the high pressure turbine prior to supplying the air to the air turbine.

19. The method of claim 18, further comprising:
sensing one or more operational parameters of the gas turbine engine system; and
determining the operational state of the gas turbine engine system based at least in part on the sensed operational parameters.

20. The method of claim 18, further comprising:
selectively coupling and decoupling the air turbine to and from, respectively, the generator.

* * * * *